United States Patent [19]

Abe et al.

[11] B 3,992,028

[45] Nov. 16, 1976

[54] CHILD RESTRAINING SEAT

[75] Inventors: Fumiyuki Abe; Shigeo Fukuda, both of Yokohama, Japan

[73] Assignee: Nissan Motor Company Limited, Yokohama, Japan

[22] Filed: Nov. 1, 1974

[21] Appl. No.: 520,341

[44] Published under the second Trial Voluntary Protest Program on March 16, 1976 as document No. B 520,341.

[30] Foreign Application Priority Data

Nov. 6, 1973 Japan............................. 48-124024

[52] U.S. Cl................................ 280/728; 297/254; 297/385; 180/82 C
[51] Int. Cl.²........................................ B60R 21/10
[58] Field of Search ............ 280/150 AB; 180/82 C; 297/216, 385, 390, 254

[56] References Cited

UNITED STATES PATENTS

| | | | |
|---|---|---|---|
| 2,974,718 | 3/1961 | Lawrence et al. | 297/385 X |
| 3,245,717 | 4/1966 | Levy | 297/254 |
| 3,672,699 | 6/1972 | De Windt | 280/150 AB |
| 3,713,667 | 1/1973 | Blanchard | 280/150 AB |
| 3,758,131 | 9/1973 | Stephenson et al. | 280/150 AB |
| 3,773,353 | 11/1973 | Trowbridge et al. | 280/150 AB |

*Primary Examiner*—Kenneth H. Betts

[57] ABSTRACT

A child restraining seat is hung securely on a back portion of a vehicle occupant seat that has mounted therein a seating sensor, such that a child, if restrained to the child seat, will not close or energize the seating sensor. The seating sensor is circuited in a trigger circuit of an air bag corresponding to the occupant seat such that the air bag will not be inflated to its active position unless said seating sensor is energized.

5 Claims, 3 Drawing Figures

CHILD RESTRAINING SEAT

The present invention relates to a child restraining seat for a motor vehicle equipped with air bags.

Air bags, now under development, for protecting occupants in collision of a motor vehicle are usually designed for adults and, when inflated by corresponding gas producers to their active positions, strike the bodies of the adults relatively hard in a vehicle collision. Children, if seated in or standing adjacent the occupant seats of the motor vehicle and involved in the vehicle collision, will surely be injured by the air bags or even killed.

It is an object of the present invention to prevent a child occupant in a motor vehicle equipped with air bags from being injured by an air bag associated with the child occupant in collision of the motor vehicle.

According to the present invention, in a motor vehicle having mounted therein an occupant seat and a trigger circuit of an air bag that corresponds to the occupant seat, the trigger circuit including a seating sensor or seat switch which is energized when an occupant sits on a seat portion of the occupant seat, to shift the trigger circuit into a condition wherein the trigger circuit will inflate the air bag in collision of the motor vehicle, there is provided a child restraining seat provided with means whereby the child restraining seat is detachably hung securely on a back portion of the occupant seat such that the seating sensor is kept deenergized by seating of a child on the child restraining seat.

Preferably, a first gas producer is circuited in the trigger circuit in series with the seating sensor and a second gas producer is circuited in the trigger circuit such that the second gas producer will be actuated in the collision of the motor vehicle irrespective of energization of the seating sensor, the second gas producer being constructed and arranged with respect to the air bag such that the air bag will be inflated to its active position when both of the first and second gas producers are actuated, but the air bag will be inflated to such an inflating position to prevent the child seating on the child restraining seat from being injured upon the inflation of the air bag by the second gas producer and from hitting on an inner structure of the motor vehicle.

The invention will become more apparent from the following description of a preferred embodiment of the invention, read in conjunction with the accompanying drawings, in which.

Figure 1:
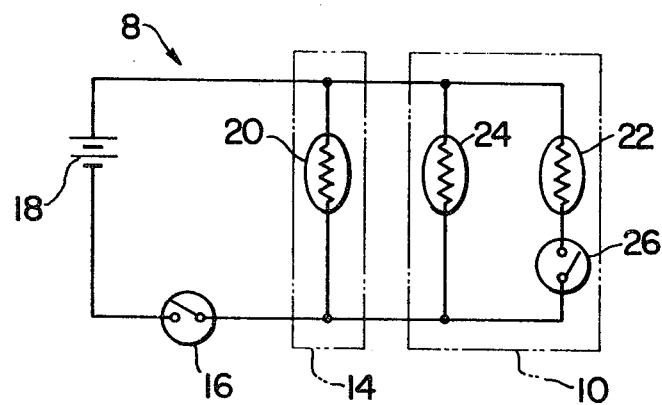
FIG. 1 is a trigger circuit diagram of air bags corresponding to a driver seat and a front occupant seat.

Referring to FIG. 1 of the accompanying drawings, there is shown a trigger circuit 8 of air bags (not shown), in which a generator 10 of an air bag corresponding to an occupant seat 12 in conventional manner is circuited in parallel with a generator 14 of an air bag (not shown) corresponding to a driver seat (not shown) also in conventional manner. Both are circuited in series with a deceleration sensor or switch 16 with a battery 18. The deceleration sensor 16 is conventional and designed to complete a circuit thereacross in collision of the motor vehicle. The generator 14 has, as is conventional, a gas producer 20 which is circuited in series with the deceleration sensor 16 so that it is actuated to inflate its air bag to its active position when the motor vehicle is involved in collision. The generator 10 has two gas producers 22 and 24 and a conventional seating sensor or switch 26 mounted in a seat portion 28 of the occupant seat 12 in such a conventional manner that it is energized or closed when an occupant sits on the seat portion 28. The gas producers 22 and 24 are connected to an air bag (not shown) corresponding to the occupant seat 12 and are circuited in the trigger circuit 8 such that when an occupant sits on the seat portion 28 of the occupant seat 12 the seating sensor 26 is energized to shift the trigger circuit into a condition wherein the trigger circuit 8 will actuate the air bag of the occupant seat 12 in collision of the motor vehicle, that is, upon closure of the deceleration switch 16. The gas producer 22 is circuited in series with the seating sensor 26, and the gas producer 24 is circuited such that it is actuated when the deceleration switch 16 is closed, irrespective of energization of the seating sensor 26. The gas producers 22 and 24 should be so designed that the air bag of the occupant seat 12 will be inflated to its active position when both of the gas producers 22 and 24 are actuated, but this gas bag will not be inflated to its active position but to such an inflating position to prevent a child seating on a child restraining seat 30 from being injured upon inflation of the air bag and from hitting on an inner structure, such as an instrumental panel, of the motor vehicle.

Figure 2:
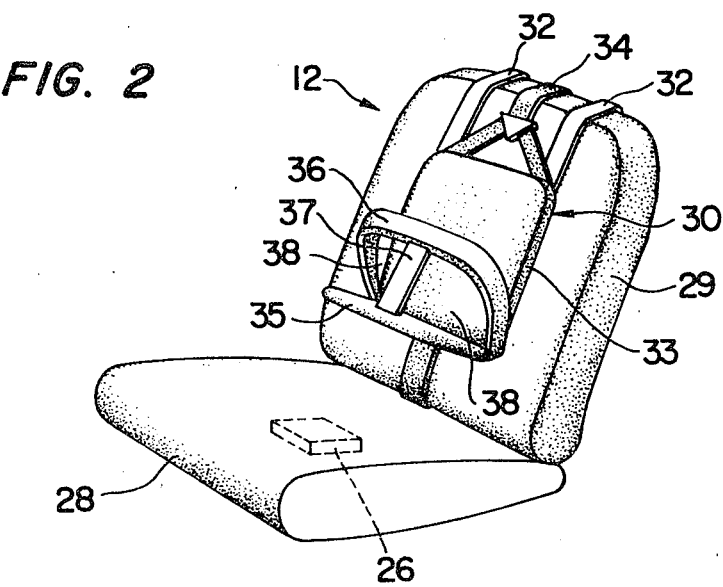
FIG. 2 shows the occupant seat provided with a child restraining seat.
Figure 3:
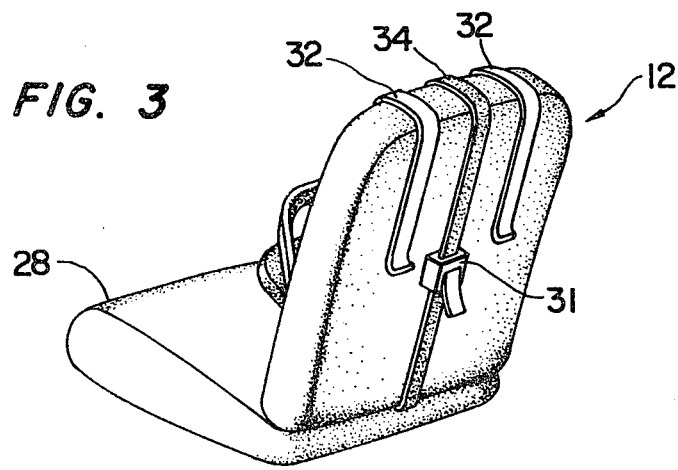
FIG. 3 is a partial rear view of the occupant seat in FIG. 2 showing how the child seat is detachably hung securely on the back portion of the occupant seat.

As best seen in FIGS. 2 and 3, the child restraining seat 30, for the purpose of being detachably hung securely on back portion 29 of the occupant seat 12 such that the seating sensor 26 is kept deenergized by seating of child on the child seat, is provided with a pair of hooks 32. The hooks 32 are secured to a back portion 33 and hung securely on the back portion 29 of the occupant seat 12. The child seat 30 is provided also with a belt system 34 which is anchored securely to the back portion 33 of the child seat 30 at one end, is detachably connected to the back portion 29 of the occupant seat by means of a conventional buckle 31 (see FIG. 3). The belt 34 extends on the back portion 29, and with the belt system the hooks 32 are prevented from being detached from the back portion 29 of the occupant seat 12. The hooks 32 are designed in such a manner that a seat portion 35 of the child seat 30 is spaced distant from seat portion 28 of the occupant seat 12 in order not to energize the seating sensor 26 when child sits on the child seat 30. To limit movement of child, the child restraining seat 30 comprises a child restraint crotch 36. A bar 37 extending between the crotch 36 and the seat portion 35 and defines openings 38 through which legs of child extend.

From the preceding description, it will be understood that since the seating sensor 26 is kept deenergized the gas producer 22 is disabled and only the gas producer 24 will be actuated upon closure of the deceleration switch during collision of the motor vehicle to inflate the air bag corresponding to the occupant seat 12. Thus the air bag will not be inflated to its active position when child sit on the child restraining seat 30.

Although in the preferred embodiment described in the preceding, two gas producers 22 and 24 and the seating sensor 26 are used and one of the gas producers is disabled by the seating sensor 26 when child sits on the child seat 30, such two gas producers can be replaced with a gas producer, which is capable of inflating an air bag to its active position, circuited in series with the seating sensor 26 and the deceleration switch 16 if a child restraining seat with a sufficient child restraint installation is used.

What is claimed is:

1. In a motor vehicle having an occupant seat and a trigger circuit of an air bag that corresponds to said occupant seat, said trigger circuit including a seating sensor which is energized when an occupant sits on a seat portion of said occupant seat, to shift said trigger circuit into a condition wherein said trigger circuit will inflate said air bag in collision of the motor vehicle, the improvement comprising a child restraining seat provided with means whereby said child restraining seat is detachably hung securely on a back portion of said occupant seat such that said seating sensor is kept de-energized by seating of a child on said child restraining seat, a first gas producer circuited in said trigger circuit in series with said seating sensor and second gas producer circuited in said trigger circuit such that said second gas producer will be actuated in the collision of said seating sensor, said first and second gas producers being constructed and arranged with respect to said air bag such that said air bag will be inflated to its active position when both of said first and second gas producers are actuated, but said air bag will be inflated to such an inflating position to prevent the child seating on said child restraining seat from being injured upon the inflation of said air bag by the second gas producer and from hitting on an inner structure of the motor vehicle.

2. The improvement as claimed in claim 1, wherein said means takes the form of a pair of hooks secured to a back portion of said child seat and hung securely on the back portion of said occupant seat and a belt system at one end anchored securely to the back portion of said child seat and at opposite end detachably connected to the back portion of said occupant seat, said belt system being extending on the back portion of said occupant seat such that said hooks are prevented from being detached from the back portion of said occupant seat.

3. The improvement as claimed in claim 1, wherein said child seat comprises a child restraint crotch strap.

4. In a motor vehicle having an occupant seat and a trigger circuit of an air bag that corresponds to said occupant seat, said trigger circuit including a seating sensor which is energized when an occupant sits on a seat portion of said occupant seat, to shift said trigger circuit into a condition wherein said trigger circuit will inflate said air bag in collision of the motor vehicle, the improvement comprising:

a plurality of gas producers, a first group of which is circuited in said trigger circuit in series with said seating sensor and a second group of which is circuited in said trigger circuit such that said second group of said gas producers will be actuated in the collision of the motor vehicle irrespective of energization of said seating sensor, said gas producers being constructed and arranged with respect to said air bag such that said air bag will be inflated to its active position when all of said gas producers are actuated, but said air bag will be inflated to an intermediate inflating position upon the inflation of said air bag by said second group of said gas producers.

5. In a motor vehicle having an occupant seat and a trigger circuit of an air bag that corresponds to said occupant seat, said trigger circuit including a seating sensor which is energized when an occupant sits on a seat portion of said occupant seat and a deceleration sensor which is energized in collision of the motor vehicle, the improvement comprising:

a first gas producer circuited in series with said seating sensor and said deceleration sensor and a second gas producer circuited in said trigger circuit such that said second gas producer will be actuated in the collision of the motor vehicle irrespective of energization of said seating sensor, said first and second gas producers being constructed and arranged with respect to said air bag such that said air bag will be inflated to its active position when both of said first and second gas producers are actuated, but said air bag will be inflated to an intermediate inflating position upon the inflation of said air bag by said second gas producer.

* * * * *